Patented Aug. 20, 1929.

1,725,362

UNITED STATES PATENT OFFICE.

HOWARD W. MATHESON, OF MONTREAL, QUEBEC, AND FREDERICK W. SKIRROW, OF SHAWINIGAN FALLS, QUEBEC, CANADA, ASSIGNORS TO CANADIAN ELECTRO PRODUCTS COMPANY, LIMITED, OF MONTREAL, CANADA.

VINYL ESTER RESINS AND PROCESS OF MAKING SAME.

No Drawing. Application filed August 15, 1927. Serial No. 213,208.

This invention relates broadly to the manufacture of synthetic gummy or resinous materials obtained by the interaction or treatment of bodies containing an ethylene linkage with saturated aliphatic aldehydes or aldehydic bodies, and relates more particularly to the manufacture of products by treatment of vinyl compounds, especially vinyl esters, with aldehydes.

In a prior application, Serial No. 147,183, filed the 8th November 1926, there is described a process of the foregoing character. The disclosure of this prior application is, however, limited to the treatment of vinyl esters with aldehydes and the proportions given in the examples are ten to fifteen parts of aldehyde to 100 parts of vinyl ester. The reaction is stated to be slow at ordinary temperatures and without pressure but to occur more rapidly under heat and pressure.

According to the present invention, bodies containing an ethylene linkage, hereinafter generally referred to as vinyl compounds, are reacted or treated with saturated aliphatic aldehydes or aldehydic bodies, hereinafter generally designated by the term "aldehydes". The reaction proceeds slowly at ordinary atmospheric temperature and pressure but, by application of heat and supersure atmospheric pressure, the reaction is greatly accelerated and the desired products obtained in commercial quantities in from six to sixteen hours or more if a large proportion of aldehyde is present. The consistency of the product varies according to the proportion of aldehyde used, those bodies made with a small proportion of aldehyde being normally hard or tough and rubbery, while those made with larger proportions of aldehyde are gummy or sticky and semi-liquid or liquid, according as the proportion of aldehyde is increased. The presence of oxygen seems to have desirable effect on the yield and rapidity of the action. Some oxygen may be taken up during the reaction but the presence of oxygen, although desirable, does not seem to be entirely necessary.

The following examples will serve to illustrate various methods of carrying out the invention but it will be understood that the invention is not limited to these examples or to the proportions, materials or conditions set forth in the examples:—

Example I.

One-tenth of one part of acetaldehyde or slightly less is added to 100 parts of vinyl acetate (by volume), and the mixture placed in a bomb where it is heated for approximately sixteen hours at a temperature of approximately 100° C. Unchanged vinyl ester and any unchanged aldehyde that may remain are separated from the product by distillation in any suitable way, and about 66 parts of a product will be obtained which is hard when cold but of a tough, rubbery consistency when warm.

Example II.

Proceeding as in Example I but using from 1 to 5 parts of acetaldehyde to 100 parts of vinyl acetate, approximately 95 parts of product will be obtained, which is slightly softer than that resulting from the process of Example I.

Example III.

Proceeding as in Example I but using from 10 to 15 parts of aldehyde to 100 parts of vinyl acetate, between 90 and 80 parts of product is obtained, which is hard when cold but, when warmed to body temperature, softens to a readily kneadable and ductile condition of about the consistency of ordinary chewing gum and which has a capacity for taking up a certain amount of water.

Example IV.

Proceeding as in Example I but using 100 parts of acetaldehyde to 100 parts of vinyl acetate, there results after distillation approximately 12 parts of a product which is soft and sticky. If larger proportions of aldehyde are used, softer products are obtained.

Example V.

100 parts of vinyl formate is treated with acetaldehyde in proportions according to the preceding examples and with approximately similar results.

*Example VI.*

100 parts of vinyl formate are treated with formaldehyde according to any of Examples I to IV with generally similar results.

Proceeding in a manner similar to that given in the examples, products may be obtained using vinyl butyrate and vinyl esters of higher molecular weight, also various aldehydes, such as butyraldehyde and aldehydes of higher molecular weight, may be used. The process may also be conducted substituting vinyl ethers, vinyl halides or other ethylene linkage bodies for the vinyl esters. The term "aldehydic bodies" hereinbefore used designates such bodies as will liberate an aldehyde during progress of the reaction, for example, paraldehyde, and more particularly if a trace of mineral acid is present which serves to decompose the paraldehyde. In the same way, bodies of the acetal type may be utilized under conditions such that they will liberate aldehyde.

It is necessary in carrying out the process that the materials used be of a certain degree of purity, since the presence of certain impurities has detrimental effect on the reaction or may completely inhibit the reaction. Sulphur and certain of its compounds are bodies which inhibit reaction and iron or copper and certain compounds thereof have detrimental effect. For this reason, it is important to avoid the use of iron or copper apparatus. The process may be conducted satisfactorily in vessels of glass, porcelain, enamel or aluminum.

The carrying out of the process is not confined to the bombing treatment but may be carried out by heating the reaction mixture under a reflux condenser, the time of reaction being considerably increased by such a procedure.

While the time and temperature disclosed in the examples are sixteen hours and 100°, it will be understood that many variations in time and temperature may be made and desirable results obtained. Reaction to a commercial extent may sometimes be obtained in six hours or less and, especially when lower temperatures are employed, the time of reaction may be extended to days or even weeks. The temperature may vary between ordinary room temperature, say 25° C., and as much above 100° C. as it is possible to go without occasioning undesirable decomposition of the product or the constituents of the reaction mixture. The pressure may also be varied as desired. For instance, using 10 to 15 parts of acetaldehyde to 100 parts of vinyl acetate at atmospheric temperature and pressure, the reaction will proceed slowly and will take several weeks to go to completion.

It will be understood that, while the proportions given in the examples range between one-tenth of one part and 100 parts of aldehyde to 100 parts of vinyl compound, the invention is not confined to this range.

Having thus described our invention, what we claim is:—

1. A process of making gummy or resinous products, which comprises reacting together a body containing an ethylene linkage and a saturated aliphatic aldehyde.

2. A process of making gummy or resinous products, which comprises reacting together a body containing an ethylene linkage and a saturated aliphatic aldehyde with heating and under pressure.

3. A process of making gummy or resinous products, which comprises reacting together a vinyl ester and a saturated aliphatic aldehyde.

4. A process of making gummy or resinous products, which comprises reacting together a vinyl ester and acetaldehyde.

5. A process of making gummy or resinous materials, which comprises reacting together vinyl acetate and a saturated aliphatic aldehyde.

6. A process of making gummy or resinous products, which comprises reacting together vinyl acetate and acetaldehyde.

7. A process of making gummy or resinous products which comprises reacting together a body containing an ethylene linkage and a saturated aliphatic aldehyde in presence of oxygen.

8. A process of making gummy or resinous products, which comprises reacting together a body containing an ethylene linkage and a saturated aliphatic aldehyde with heating and under pressure in presence of oxygen.

9. A process of making gummy or resinous products, which comprises reacting together 100 parts of a body containing an ethylene linkage and one-tenth of one part to upwards of 100 parts of a saturated aliphatic aldehyde.

10. A composition of matter resulting from reacting together a body containing an ethylene linkage and a saturated aliphatic aldehyde.

11. A composition of matter resulting from reacting together a body containing an ethylene linkage and a saturated aliphatic aldehyde with heating and under pressure.

12. A composition of matter resulting from reacting together a vinyl ester and a saturated aliphatic aldehyde.

13. A composition of matter resulting from reacting together a vinyl ester and acetaldehyde.

14. A composition of matter resulting from reacting together vinyl acetate and a saturated aliphatic aldehyde.

15. A composition of matter resulting from reacting together vinyl acetate and acetaldehyde.

16. A composition of matter resulting from reacting together a body containing an ethylene linkage and a saturated aliphatic aldehyde in presence of oxygen.

17. A composition of matter resulting from reacting together a body containing an ethylene linkage and a saturated aliphatic aldehyde with heating and under pressure in presence of oxygen.

18. A composition of matter resulting from reacting together 100 parts of a body containing ethylene linkage and one-tenth of one part to upwards of 100 parts of a saturated aliphatic aldehyde.

In witness whereof, we have hereunto set our hands.

HOWARD W. MATHESON.
FREDERICK W. SKIRROW.